United States Patent [19]

Nehm

[11] Patent Number: 5,643,521

[45] Date of Patent: Jul. 1, 1997

[54] PROCESS FOR PRODUCING SANITARY FITTINGS

[75] Inventor: Holger Nehm, Mullheim, Germany

[73] Assignee: Dieter Wildfang GmbH, Mullheim, Germany

[21] Appl. No.: 573,860

[22] Filed: Dec. 18, 1995

Related U.S. Application Data

[60] Continuation of Ser. No. 235,470, Apr. 29, 1994, abandoned, which is a division of Ser. No. 107,066, Aug. 17, 1993, Pat. No. 5,370,150.

[30] Foreign Application Priority Data

Aug. 19, 1992 [DE] Germany .............. 42 27 356.0

[51] Int. Cl.$^6$ .................... B29C 45/14; B29C 33/42
[52] U.S. Cl. .................... 264/255; 264/250; 264/267; 264/273
[58] Field of Search .................... 264/250, 254, 264/259, 267, 268, 273, 274, 275, 255, 328.1, 328.8, 294; 425/129.1, 130

[56] References Cited

U.S. PATENT DOCUMENTS

| | | | |
|---|---|---|---|
| 4,038,359 | 7/1977 | Pendleton | 264/268 |
| 4,297,313 | 10/1981 | Duckstein | 264/273 |
| 4,338,278 | 7/1982 | Schultz | 264/273 |
| 4,342,799 | 8/1982 | Schowchert | 264/273 |
| 4,410,479 | 10/1983 | Cyriax | 264/255 |
| 4,518,554 | 5/1985 | Hatakeyama et al. | 264/268 |
| 4,732,724 | 3/1988 | Sterner | 264/273 |
| 4,842,540 | 6/1989 | Endo et al. | 264/273 |
| 4,903,997 | 2/1990 | Kifer | 264/255 |
| 4,988,472 | 1/1991 | Orimoto | 264/273 |
| 5,401,453 | 3/1995 | Moretz et al. | 264/274 |

Primary Examiner—Angela Ortiz
Attorney, Agent, or Firm—Dallett Hoopes

[57] ABSTRACT

A fitting (1) designed for example as a non-return valve (2) has an outer housing (3) having an inner lip seal (7) interacting with a closing element (5), and also an outer annular seal (8). Both the outer housing (3) and the seals (7, 8) are designed as injection moldings. The production of the outer housing with the seals takes place in an injection molding process in which, first of all, the outer housing and, in a second operation, the seals are injection molded appropriate, more than two operations, in particular in the case of more than two injection molding material components, can also be provided. By means of the injection molded seals, the latter are durably and closely bonded to the outer housing (3) resulting in simplifications regarding production technology and design (FIG. 1).

4 Claims, 3 Drawing Sheets

PROCESS FOR PRODUCING SANITARY FITTINGS

This is a continuation of application Ser. No. 08/235,470, filed Apr. 29, 1994, now abandoned which is a divisional of application Ser. No. 08/107,066 filed Aug. 17, 1993, now U.S. Pat. No. 5,370,150.

BACKGROUND OF THE INVENTION

The invention relates to a process for producing sanitary fittings or the like which are produced by plastics injection molding and have at least one seal. In addition, the invention relates to a sanitary fitting or the lake which is produced according to the process, is made of plastic and has externally and/or internally in each case at least one seal.

In the production of such sanitary fittings it has hitherto been necessary subsequently to assemble the separately produced parts—installed elements or basic elements, seals and the like—and then to carry out another leaktightness test, in particular also in the sealing region between the sealing element and the basic element holding it. This is comparatively complicated.

In the production of the basic element by means of all injection mold and two-part followers, care must be taken that the groove-like recess, for example for an external O-ring, in the follower-split region is produced as far as possible free of flash, since such flash call lead to leakages.

Leakages can also occur owing to a misalignment, appearing with time, of the two injection mold followers with respect to one another.

Care must also be taken that O-rings have, internally and externally, a surrounding parting line and that correctly positioned assembly is necessary for good sealing. If, due to rotation of the O-ring, the parting lines were to run round in a helical manner, leakage channels would form.

Because of the necessary prestressing of the assembled O-rings, an embrittlement of the sealing material is promoted, in particular in the case of relatively long mounting times.

If the fitting also has a seal, for example in the case of a non-return valve a lip seal interacting with a closure element, the assembly causes problems since this lip seal is very small and the handling during assembly is difficult. Since this seal is not secured and held after insertion, the position of the basic element during continued assembly must remain maintained such that the seal does not fall out again after insertion.

The seal must be secured in the insertion position by design measures in the other assembly parts, for example by means of a supporting ring to be fitted.

The individual assembly parts can only have very low dimensional tolerances, since otherwise the individual errors can accumulate until the total dimensional deviation is no longer acceptable. This relates to the annular groove or shaped groove for the sealing rings and also to the cross section of the seals themselves.

In the assembly of the individual parts, foreign bodies—hairs, fluff or other particles—can also come between the individual assembly parts, also leading to leakages.

The object of the present invention is to provide a production process and a product produced according to said production process in which the aforementioned disadvantages are avoided. The aim is in particular substantially to simplify the production and the assembly. Despite these simplifications, the aim is to achieve a particularly small dimensional tolerance of the finished parts, this being the case even for mass production involving large quantities. Finally, by means of the measures according to the invention, there should also be the possibility of design simplifications.

In order to achieve this object, it is proposed with reference to the process according to the invention that in a first operation, the basic element of the sanitary fitting is injection molded and, in at least one further operation, the material for the seal(s) is injection molded into the receiving openings present in the basic element for this.

By this process, the assembly steps for the attachment of the seals are dispensed with, since the latter are simultaneously injection molded in the injection molding machine. By means of this injection molding process, a good sealing in the transition region between the basic element and seal(s) is provided, so that, inter alia, leakage tests following the production or assembly are thereby no longer necessary as before. By means of the injection molding, the seals can also be held bonded to the basic element, so that no complicated additional measures in the assembly end the constructional design are necessary.

Any flash in the seating or mounting region of the seal(s) occurring during the production of the basic element, or other irregularities on the basic element, for example by a mold misalignment, no longer have a disadvantageous effect, since such irregularities are covered by the injection molded seals.

Special measures at the assembly station for keeping away foreign bodies—hairs, fluff—are now no longer necessary since the basic element and the seal(s) are present as a complete assembly unit at the assembly station.

Since the material of the seals injection molded on the basic element is in a relaxed position, a greater long-term stability and durability in the case of relatively long mounting can also be expected.

It is preferably provided that, in the case of assemblies having a plurality of seals, these seals are injection molded jointly in one operation, preferably via runners connected to one another.

Even in the case of a plurality of injection molded seals, the work outlay is thereby kept small.

However, there is also the possibility that in the case of assemblies having a plurality of seals, these seals are injection molded in succession, if required with different injection molding material.

This is advantageous particularly in the case of different injection molding material for the seals and also in the case of seals lying close to one another.

However, it is also possible to introduce different injection molding material for different seals in one injection molding operation if separate runners are provided and/or the distance between the seals is sufficiently great that a "mixing" of the different injection molding materials need not be feared.

The gating of the seals is expediently carried out outside the particular seal-seat region of the seals. Subsequent leakage points caused by gate marks are thereby avoided.

In the case of a sanitary fitting, in order to achieve the said object, it is proposed that the basic element of the fitting and the seal(s) be plastics injection moldings made of different material and that the seal(s) be closely bonded to the basic element by injecting molding on.

The basic element with the seal or seals is here virtually "cast in one piece", the close bonding of the seals consisting of a different, usually softer and more flexible material than the basic element, taking place during the injecting molding.

By means of the direct injection molding of the seal(s) onto the basic element, an especially good dimensional accuracy and dimensional constancy can be achieved, even in the case of large quantities of the assembly or the like.

If still further parts are to be bonded to the assembly, this can take place in more simple assembly steps in which, for example, a positional fixing of the seal(s) and the like is not necessary since these seals are already firmly bonded to the basic element. The assembly outlay is thus reduced.

The basic element expediently has, in the region of the seal(s), seating chambers in the form of open molded recesses, annular grooves or the like. Even when injection molded on, the seal can thereby have a cross-sectional volume necessary for elastic yielding and, moreover, is also held with a positive fit.

It is advantageous if, at the opening sides of the molded recesses or the like, gate points, if required additional gate points, are provided which are preferably located outside the seat-seal region, the seals having at least one, preferably surrounding cross-sectional recess from their outer seal-seat side in which the gate point(s) is (are) located.

Gate points directly at the "open" sides of the respective seal have the advantage that separate runners within the basic element are not required.

It is advantageous if, in the case of a plurality of seals arranged in particular adjacently, the molded recesses thereof in the basic elements are connected to one another via connecting channels which are filled with sealing material. A plurality of seals can thereby be injection molded from a common gating side and it is also advantageous that a retaining connection stabilizing the seals with respect to one another is provided by means of the connecting channels.

A preferred embodiment of the invention provides for the assembly to be a non-return valve with an external ring seal and with an internal lip seal interacting with a closure element and for the annular seal and/or the lip seal to be designed as plastics injection moldings and to be bonded to the basic element by the injection process.

SUMMARY OF THE INVENTION

The present invention is a process for making a sanitary fitting comprising molding a plastic tubular body having annular sealing recesses in and end thereof and a connecting passageway between the recesses; enclosing said end in a female mold having surface means aligned with and sealingly confronting respectively the recesses for forming parts of respective seals; injecting plastic into the mold through a gate in one of the surface means to fill the recesses and the passage means with plastic, permitting the plastic to set and removing the tubular body from the mold.

In fittings the process according to the invention can be applied in an especially advantageous manner, since here, in the hollow basic element, an internal lip seal and, approximately radially outwardly adjacently, an external annular seal are provided which can be bonded to the basic element in a single injection molding process. Guide parts, which can be inserted into the inner cavity, for a closing element interacting with the lip seal no longer need to be equipped with a supporting ring for fixing the lip seal as before, since this seal is fixed by the injection molding process itself.

BRIEF DESCRIPTION OF THE DRAWINGS

Additional developments of the invention are specified in the further subclaims. The invention with its essential details is explained in greater detail below with the aid of the drawings, in which:

DESCRIPTION OF THE PREFERRED EMBODIMENTS

Figure 1:
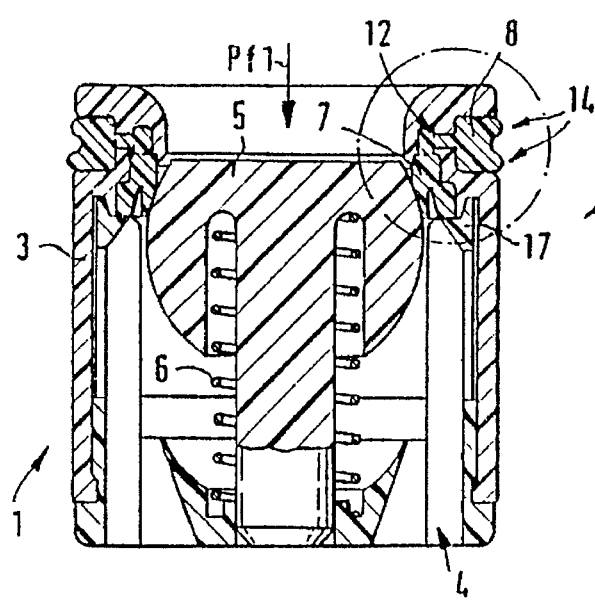
FIG. 1 shows a longitudinal section through a non-return valve having an outer annular seal and an inner lip seal.

A fitting 1 shown in FIG. 1 is defined as a non-return valve 2 and has an outer housing 3 in which a closing element 5 is disposed within a valve guide part 4.

In the through-flow direction (arrow Pf1) the closing body 5 can be displaced into the opening position against the return force of a spring 6 and, in the illustrated closing position, bears against an inner lip seal 7.

The non-return valve is, in the exemplary embodiment shown in FIGS. 1 to 4, provided for installation in pipelines and has externally on its outer housing 3 an annular seal 8.

Both the lip seal 7 and the annular seal 8 are bonded by an injection molding process to the outer housing 3. During the injection molding of the outer housing 3, they are introduced into the molded recesses 9 disposed in the outer housing 3 in a second injection molding operation. For the annular seal 8, an outwardly open annular groove 10 is provided as the molded recess and, for the lip seal 7, a seating groove 11 which is disposed on the inside of the outer housing 3, is open in the axial direction of the non-return valve 2 and continues in a step-like manner is provided (cf. FIG. 2).

For the gating of the two seals 7, 8, gate points are provided which are identified by the arrows Pf2. In the exemplary embodiment shown in FIGS. 1 and 2, these gate points are provided at points located outside the seal-seat region. FIGS. 2a and 2b show the structure of FIG. 2 enclosed in a mold having the alternate gating implicit in FIG. 2. The mold parts are designated A, B and A', B' respectively. Since the molded recesses 9 are connected to one another via connecting channels 12, it would also be sufficient to gate from one side.

Figure 2:
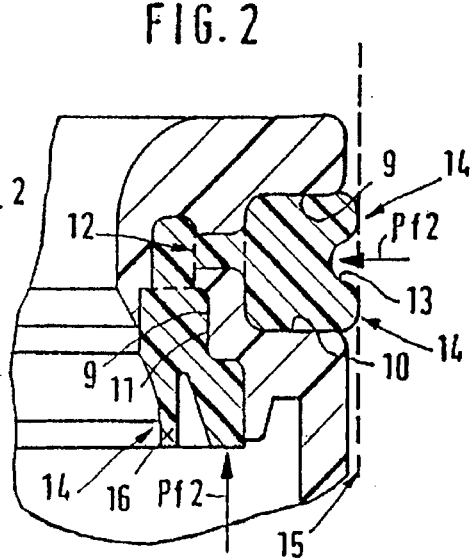
FIG. 2 shows an enlarged detail-section view in the region of the two seals.
Figure 2A:
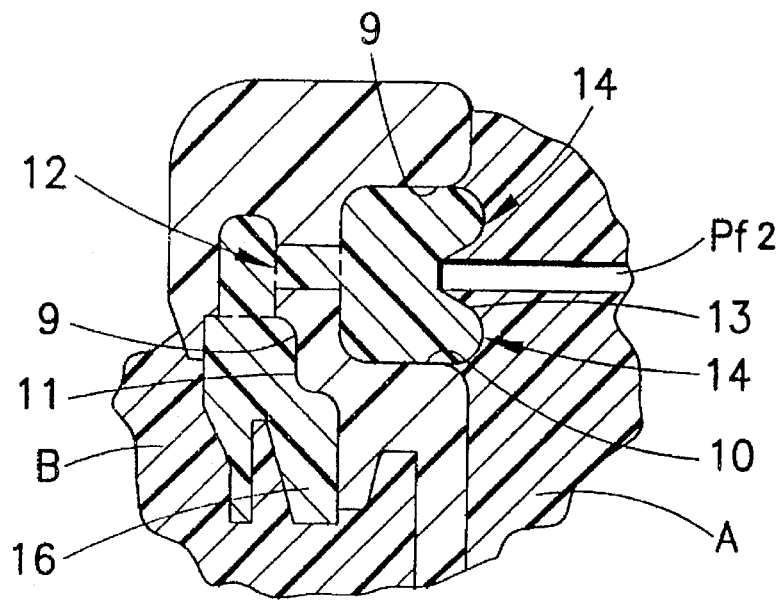
FIG. 2a is a fragmentary sectional view showing the structure of FIG. 2 enclosed in mold portions to demonstrate the position of the gating as is implicit in FIG. 2.
Figure 2B:
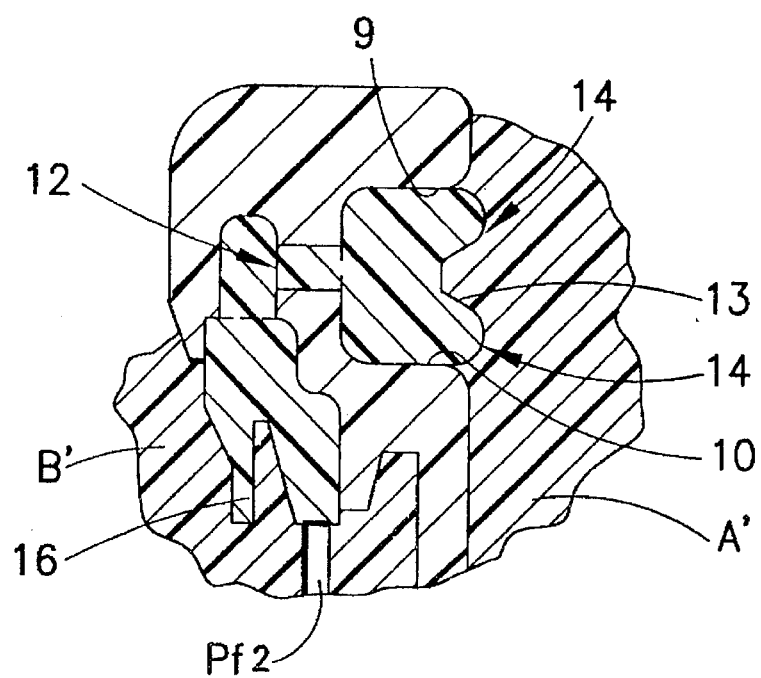
FIG. 2b is comparable to FIG. 2a showing the alternate gating position also implicit in FIG. 2.

In the annular seal 8, a cross-sectional recess or molded recesses 13 are provided on the outside, at least in the region of intended gate points, so that any gate flash forming is disposed outside the seal-seat region 14 on the inside 15 of a cylinder indicated with dashed lines in FIG. 2.

As already mentioned above, it would be sufficient to gate from one side and to introduce both seals 7, 8 in a single injection molding operation. In the case of seals with complicated shapes, in particular, it may however also be expedient to gate from a plurality of sides and/or via a plurality of gate points.

An inside gate point which may additionally be provided can be provided in the case of the lip seal 7 in the radial outer region thereof and therefore outside the actual sealing lip 16.

Figure 3:
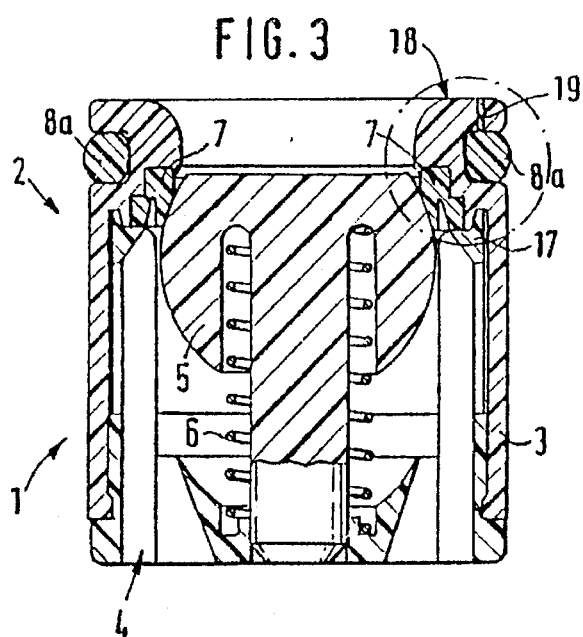
FIG. 3 shows a view, approximately corresponding to FIG. 1, of a non-return valve, however with a different design of the outer annular seal here.

By means of the injection molding process itself, the sealing material is firmly bonded in the separating regions in the inner walls of the molded recesses 9 of the outer housing 3. The separating regions are thus also well sealed, so that tightness tests as hitherto, in which tightness between the outer housing 3 and the respective seal was tested in particular, are unnecessary. The channels 12 between the outer annular seal 8 and the inner lip seal 7 also provide another positive-fitting connection, so that, overall, additional holders for the seals are not necessary either in the assembly position or in the operating-position. Although FIGS. 1 and 3 show in each case a valve guide part 4 with a stabilizing ring 17 which faces the lip seal 7 and is disposed below the lip seal, said stabilizing ring 17 does not here have the function of keeping t lip seal already fixed by the injection molding in its seating groove 11.

Figure 4:
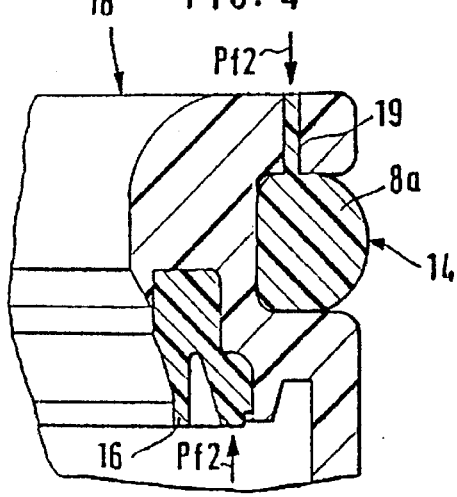
FIG. 4 shows an enlarged detail view in the region of the seals according to FIG. 3.

If the same sealing materials are provided for the two seals 7, 8, a single injection molding operation is sufficient. If, however, different sealing materials are used for the outer annular seal and the inner lip seal, for example a somewhat softer, flexible material for the lip seal 7, it may be expedient to injection mold the two seals separately from one another and, if appropriate, also to provide injection molding operations taking place in succession. However, there is also the possibility of introducing different injection molding materials in a single injection molding operation. In particular with the simultaneous introduction of different injection molding materials, it is expedient not to provide connecting channels 12 between the seating grooves for the seals, as shown in FIGS. 3 and 4. In this embodiment of a non-return valve 2, an annular seal 8a is provided which is different in cross section from FIG. 1 and 2. This annular seal 8a has on its outside a rounded profile and therefore no gate point is provided on the outside at the opening side of the annular groove 10. In this case gating could take place only via an inner gate point in the case of the lip seal 7 and via connecting channel 12 and/or, for example, from the upper end side 18 of the outer housing 3 a runner 19 to the annular groove 10, the connecting channels 12 or the seating groove 11 could be provided.

Figure 5:
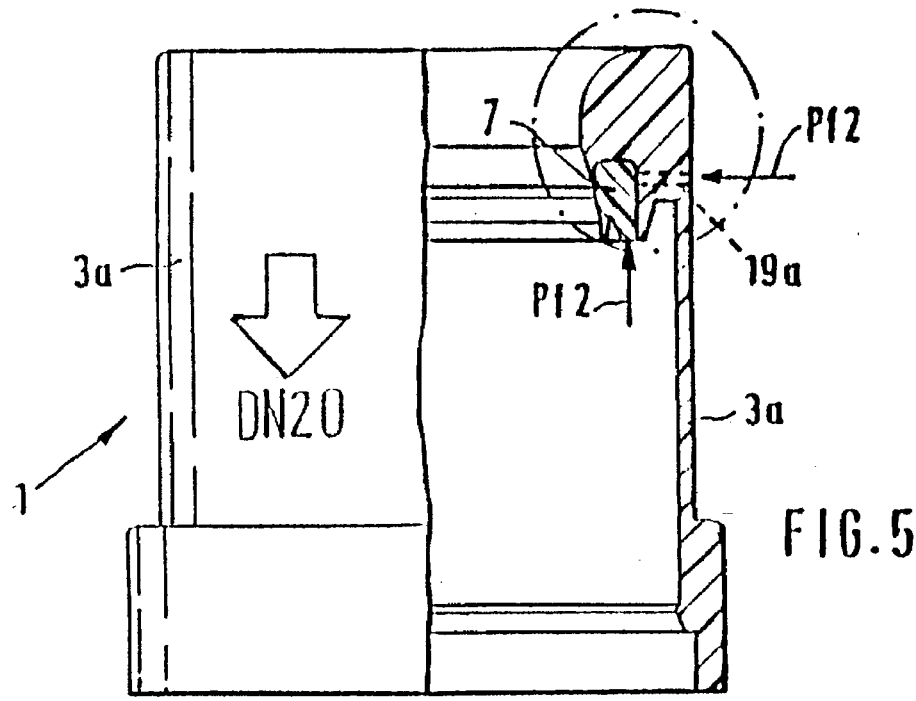
FIG. 5 shows a partial longitudinal section through a basic element of a non-return valve with an internally arranged lip seal and FIG. 6 shows an enlarged detail view in the region of the seal of the non-return valve according to FIG. 5.
Figure 6:
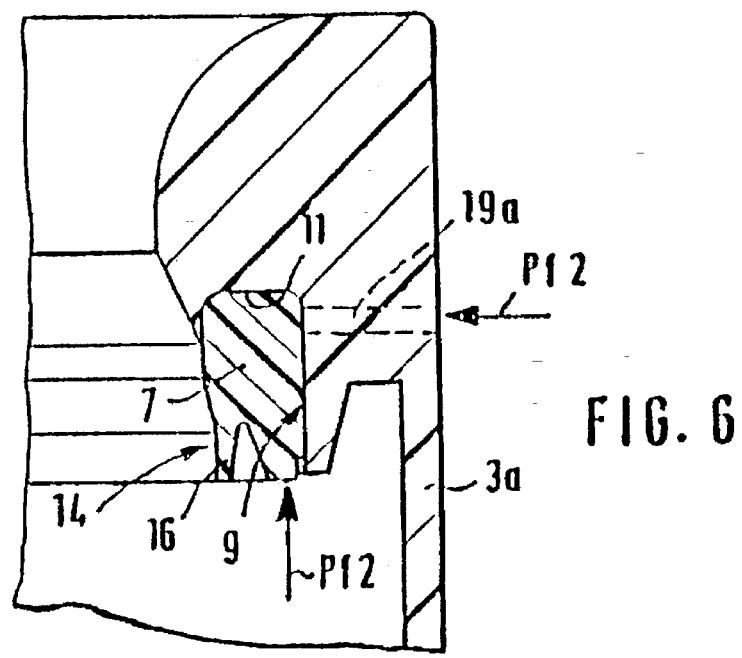

Finally, FIGS. 5 and 6 also show the outer housing 3a, provided with an inner lip seal 7, of a non-return valve, this outer housing being provided in so-called cartridge design for installation in water meters. An outer seal is not provided here.

The inner lip seal can, as indicated by the arrow Pf2, have on its radially outer free region which lies outside the sealing zone one or more gate points.

As indicated by dashed lines, instead of this gate point or additionally, a runner 19a from the outer side of the housing 3a could also be provided. Here, too, the lip seal 7 is sufficiently strong after the injection molding operation and tightly bonded to the outer housing 3a.

It can also be mentioned that the respective seal-seat region 14, that is to say the outer contour in each case of the seals 7, 8, 8a, determines the dimensional relationships, This is predetermined precisely and reproducibly with the smallest tolerances by the injection mold. Dimensionally exact fittings with extremely small tolerances can thus be produced even in mass production.

The inner contour of the molded recesses for the seals and their dimensions thus have no influence on the outer dimension of the seals and the otherwise necessary, complex measures for exact dimensional accuracy are therefore also not necessary.

The outer housing 3, 3a which is designed as an injection mold can, for example, consist of polypropylene, and an injection moldable, rubbery material, for example based on silicone or injection moldable NBR material, is used for the seals 7a, 8, 8a. For identification and monitoring, differently colored materials can also be used, so that for monitoring, for example, a good contrast to the adjacent housing or the like is available.

The injection mold provided for producing the fitting is expediently designed as a rotatable mold, the outer housing being injection molded in a first position and then the seals in a rotated position.

What is claimed is:

1. A process for making a sanitary fitting comprising:
  a. molding a plastic tubular body having a first end and an opposite end, the first end having a longitudinal axis, a peripheral outer seal recess about the outside of the first end at an annular groove, an inward annular enlargement at the first end, the enlargement presenting within the tubular body an annular shoulder concentric with the axis generally facing away from the first end, the shoulder being formed with a lip seal recess in the shoulder concentric with the axis and facing away from the first end, the body having internal passage means communicating between the outer seal recess and the lip seal recess,
  b. closing at least the first end of the tubular body in a mold having first and second surface means aligned with and sealingly confronting respectively the outer seal recess and lip seal recess to define with the recesses cavities for forming respective seals,
  c. forming a gate in only one of the first and second surface means in a position which in the finished fitting is on the exposed seal surface but not at a point on a seal-seat region of the seal,
  d. injecting fluid plastic into the mold through the gate and into a space defined by the surface means, the recesses and the passage means, so that the plastic communicates to and fills both cavities through the passage means, and forms integral seals on both the outside of the tubular body at said annular groove, and the inside of the tubular body at the shoulder, and
  e. permitting the plastic to set, thus forming the sanitary fitting and removing the sanitary fitting from the mold.

2. A process as claimed in claim 1 wherein the tubular body is made of one plastic and one of the seals is made of another plastic.

3. A process as claimed in claim 1 wherein the tubular body is of polypropylene and the seals are of a rubbery material.

4. A process as claimed in claim 3 wherein the seals are of silicone.

* * * * *